United States Patent [19]

Hsu

[11] Patent Number: 5,640,177
[45] Date of Patent: Jun. 17, 1997

[54] OPTICAL ANALOG ROCKER

[75] Inventor: Fan-yi Hsu, Taipei Hsien, Taiwan

[73] Assignee: Anko Electronic Co., Ltd., Taipei, Taiwan

[21] Appl. No.: 404,613

[22] Filed: Mar. 15, 1995

[51] Int. Cl.$^6$ .............. G09G 5/08; G06M 7/00
[52] U.S. Cl. .............. 345/161; 250/221; 463/38
[58] Field of Search .............. 345/158, 161, 345/166; 250/221, 222.1, 231.1, 231.16, 231.17, 231.18, 231.13, 231.14; 74/471 XY; 273/148 B; 463/38, 36; 180/333, 907; 338/85, 163, 165, 166

[56] References Cited

U.S. PATENT DOCUMENTS 3,814,199  6/1974  Jones ............... 180/333
3,886,361  5/1975  Wester ............. 250/221
5,117,102  5/1992  Mitchell ........... 250/221

Primary Examiner—Richard Hjerpe
Assistant Examiner—Kara Farnandez Stoll
Attorney, Agent, or Firm—Beveridge, DeGrandi, Weilacher & Young, L.L.P.

[57] ABSTRACT

An optical analog rocker in which mechanical movements of a manipulated control rod of the rocker are converted into electronic signals by means of an infrared emitter and an infrared receiver. The infrared receiver shifts relative to the infrared emitter when the control rod is swayed in different directions and thereby, changes the distance between it and the infrared emitter. The changing distance causes the infrared receiver to generate light-sensitive signals of different high or low linear voltage and current. The signals are received by a game interface card and are correctly sent to a computer. With these arrangements, the disadvantages associated with a worn variable resistance contact included in a rocker, such as poor contact condition and unstable signal output can be avoided.

2 Claims, 5 Drawing Sheets

OPTICAL ANALOG ROCKER

FIELD OF THE INVENTION

The present invention relates to an optical analog rocker, and more particularly to a rocker in which an infrared receiver and an infrared emitter are used to convert the rocker's mechanical movements into electronic signals.

BACKGROUND OF THE INVENTION

Games to be played on a computer are manipulated through rockers. A conventional rocker generally has an external control rod which can be gripped or held by a user and moved in different directions. During operation of the rocker, the movements of the control rod are converted into electronic signals which are received by a game interface card before being sent to a system unit to control the movement of a cursor on a computer screen.

In the conventional rocker, the movement of the control rod causes a variable resistance contact to displace. With different resistances, different electronic signals are generated for the computer to identify, allowing the cursor to move when the control rod is manipulated by the user.

There are shortcomings that exist in such a conventional rocker when it is operated. The variable resistance contact wears and loses its carbon powder after a long-term period of use. This causes poor contact which makes the output signals from the interface card unstable. For some games that are more exciting, the control rod is frequently moved by the user at a very quick speed. Such quick movements of the control rod by the user further increase the chances of wearing and damaging the variable resistance contacts, and therefore, shortens the usable life of the conventional rocker.

SUMMARY OF THE INVENTION

A primary object of the present invention is to provide an optical analog rocker in which an infrared emitter and an infrared receiver are used instead of the variable resistance contacts conventionally included in the rocker. Because of the photoelectric transmission manner, the shortcoming of contact wear due to long-term period of use can be avoided.

When a phototransistor is used under normal condition, it has a considerable long usage life. In the present invention, optical elements are combined with the other mechanical structure to not only eliminate the shortcomings of conventional variable resistance contacts and prolong the usable life of the rocker but also enable signals to be correctly input to the computer.

BRIEF DESCRIPTION OF THE DRAWINGS

The above object and other advantages of the present invention may be better understood through the following detailed description of the preferred embodiment and the accompanying drawings wherein.

DETAILED DESCRIPTION OF THE PREFERRED EMBODIMENTS

Figure 3:
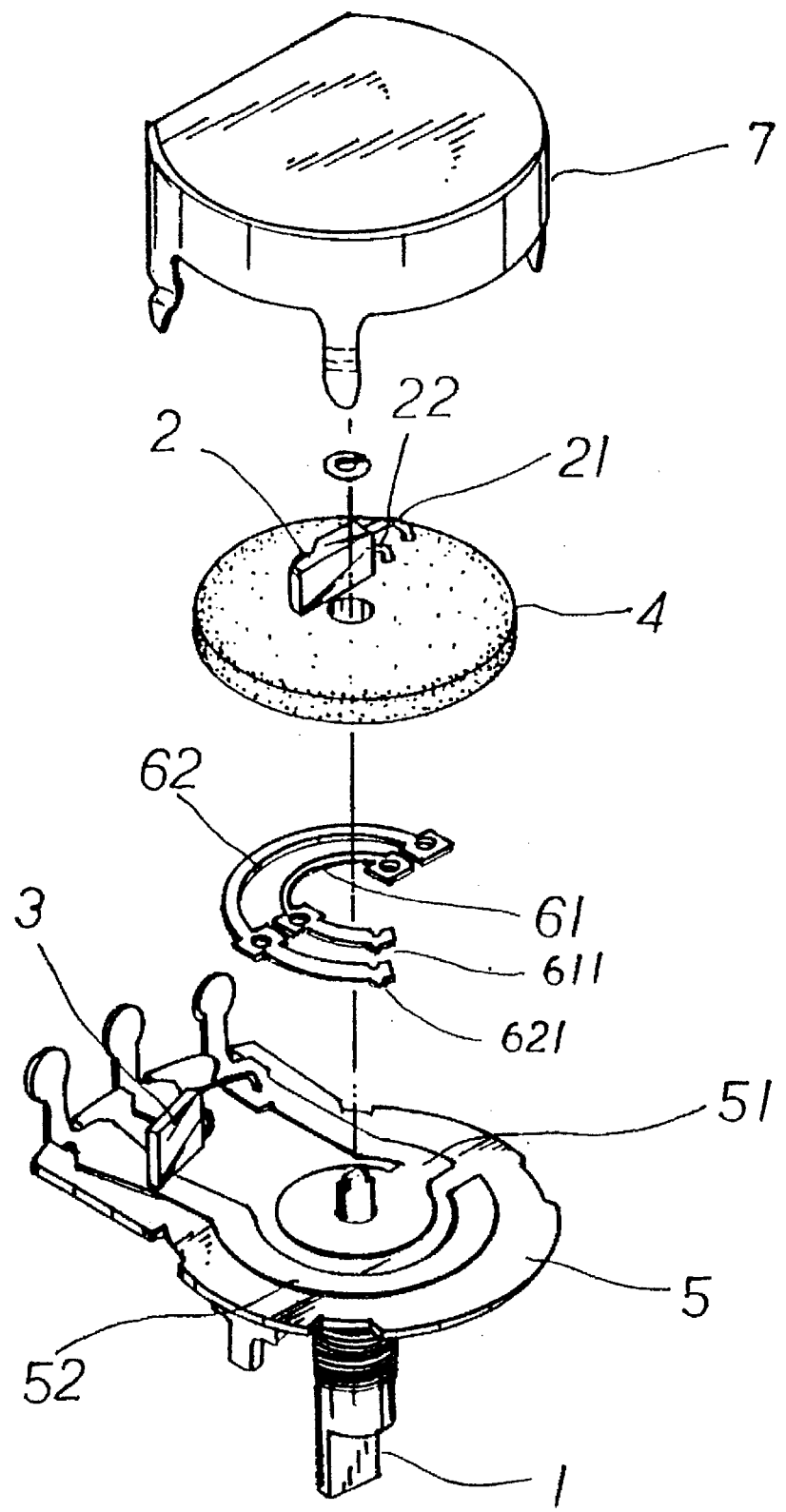
FIG. 3 is an exploded perspective diagram showing the mechanical structure of the photoelectric element in the rocker according to the present invention.
Figure 4:
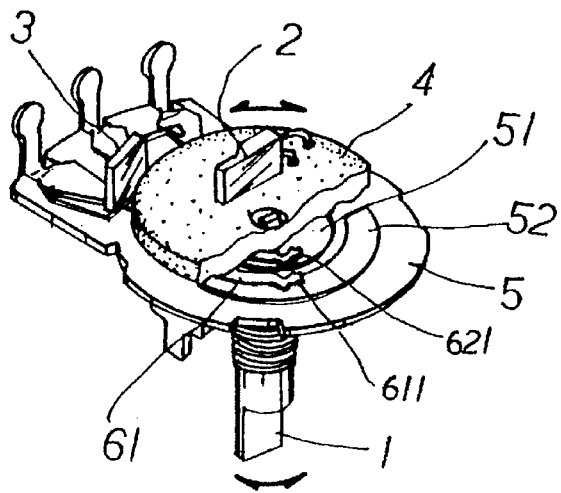
FIG. 4 is an assembled perspective of the photoelectric element of FIG. 3.
Figure 7:
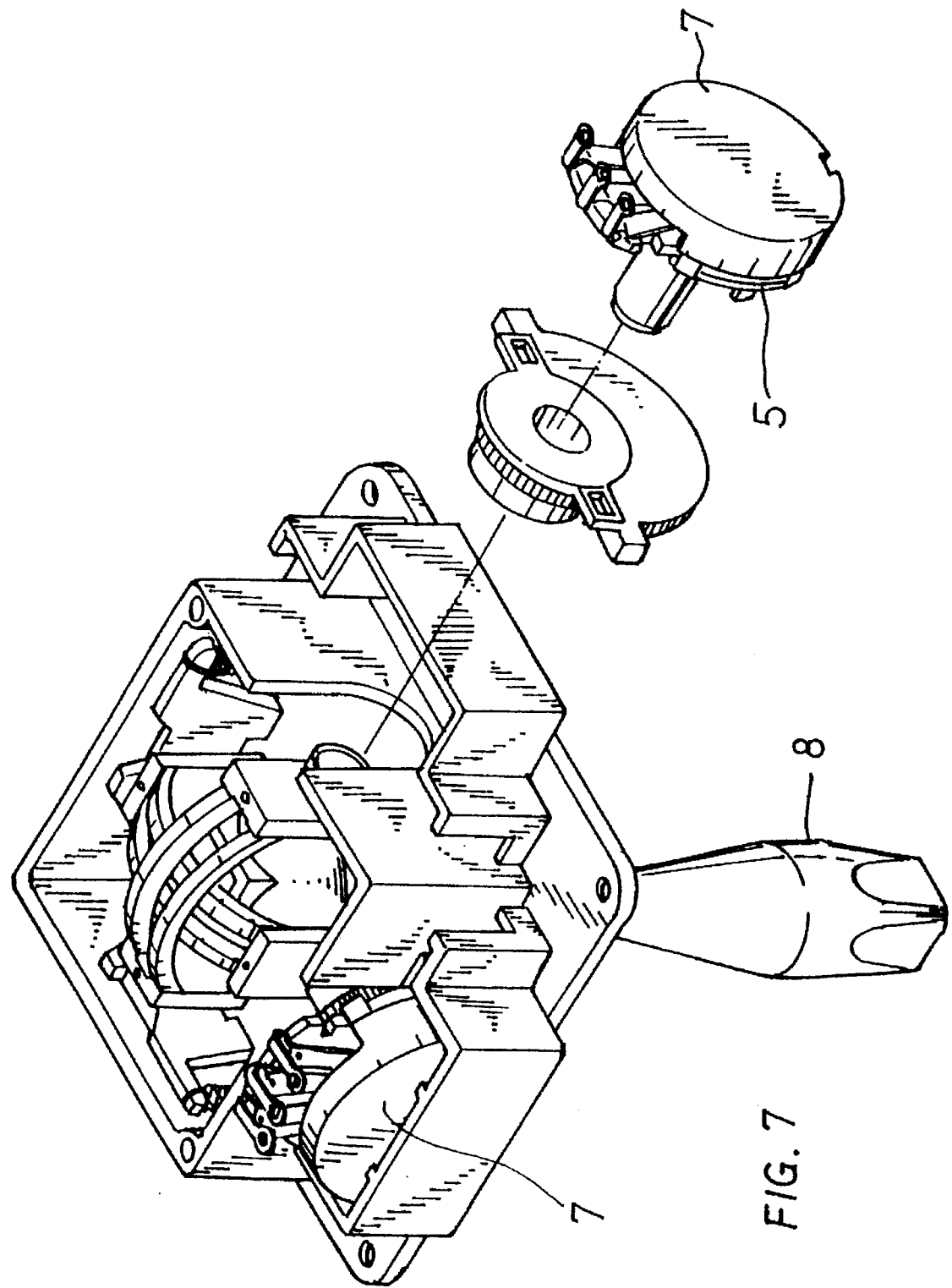
FIG. 7 illustrates a rocker according to the present invention equipped with two sets of the photoelectric elements as shown in FIG. 4, wherein one set of the elements has been assembled and mounted in the rocker while the other set has not.

Please refer to FIGS. 3 and 4 which respectively show an exploded and an assembled perspective of a preferred mechanical structure of a photoelectric element of a rocker according to the present invention. The photoelectric element includes a rotational shaft 1 which engages with an external control rod 8 (as shown in FIG. 7) of the rocker, such that a transverse or a longitudinal shift of the control rod 8 is converted into an angular rotation of the rotational shaft 1. This part has the same effect as that provided by a rocker including a conventional variable resistance and is therefore, not discussed herein.

An infrared receiver 2 is fixed to a rotational disk 4 which rotates along with the rotating rotational shaft 1 and thereby causes the receiver 2 to displace. An infrared emitter 3 is fixed to a stationary base plate 5 which is disposed over and around the rotational shaft 1 and has two conductive plates 51, 52 fixed thereto. The infrared receiver 2 has two connectors 21, 22 which extend through the rotational disk 4 to contact and electrically connect with two conductive leaf sting members 61, 62 disposed between the rotational disk 4 and the base plate 5. The leaf spring members 61, 62 have a hook portion 611, 621, respectively, formed at their free ends. The hook portions 611, 621 slidably move on the conductive plates 51, 52, respectively, to form an electrical connection between the conductive leaf spring members 61, 62 and the conductive plates 51, 52.

A cap member 7 is used to house the assembled disk 4, the conductive leaf spring members 61, 62, the conductive plates 51, 52, and the base plate 5, and, of course, the infrared receiver 2 and the infrared emitter 3, to block light which might interfere with the infrared receiver 2 and the infrared emitter 3 and thereby, the cap member 7 ensures correct signal reception and emission.

When operating the rocker by means of the control rod 8, the transverse and longitudinal movements of the control rod 8 are converted into angular rotations of the rotational sheet 1 which in turn rotates the rotational disk 4 engaged around the rotational shaft 1. The rotation of the disk 4 causes the infrared receiver 2 fixed thereto to shift, changing its position relative to the infrared emitter 3 and thereby produces different distances between the receiver 2 and the emitter 3 at different times. These different distances further cause the infrared receiver 2 to generate light-sensitive signals of high or low linear voltage and current. The signals are received by a game interface card to be correctly sent into a computer.

Figure 5:
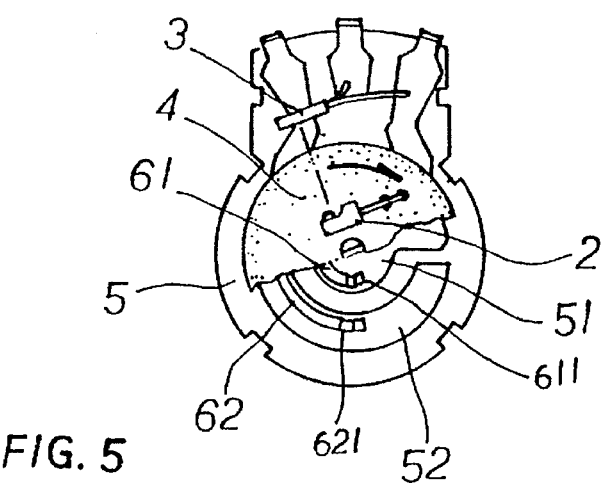
FIG. 5 is a plan view of the photoelectric element of FIG. 3 with the infrared receiver at a position close to the infrared emitter.
Figure 6:
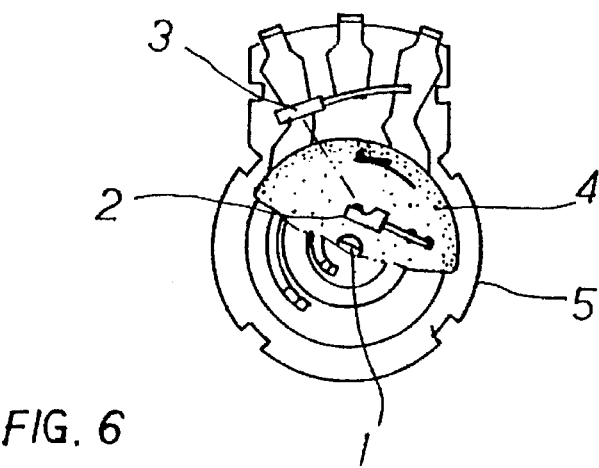
FIG. 6 is a plan view similar to FIG. 5 but with the infrared receiver at a position distant from the infrared emitter.

FIGS. 5 and 6 illustrate the shift of the infrared receiver 2 relative to the infrared emitter 3 caused by the disk 4 which rotates along with the rotational shaft 1. FIG. 5 shows the infrared receiver 2 being shifted to a position closest to the infrared emitter 3 and therefore having a small inductive current value. On the contrary, FIG. 6 shows the infrared receiver 2 being shifted to a position furthest from the infrared emitter 3 and therefore having a largest inductive current. That is, in the present invention, a feasible photo-electrical control is employed to generate light-sensitive signals of different linear voltages and currents.

Figure 1:
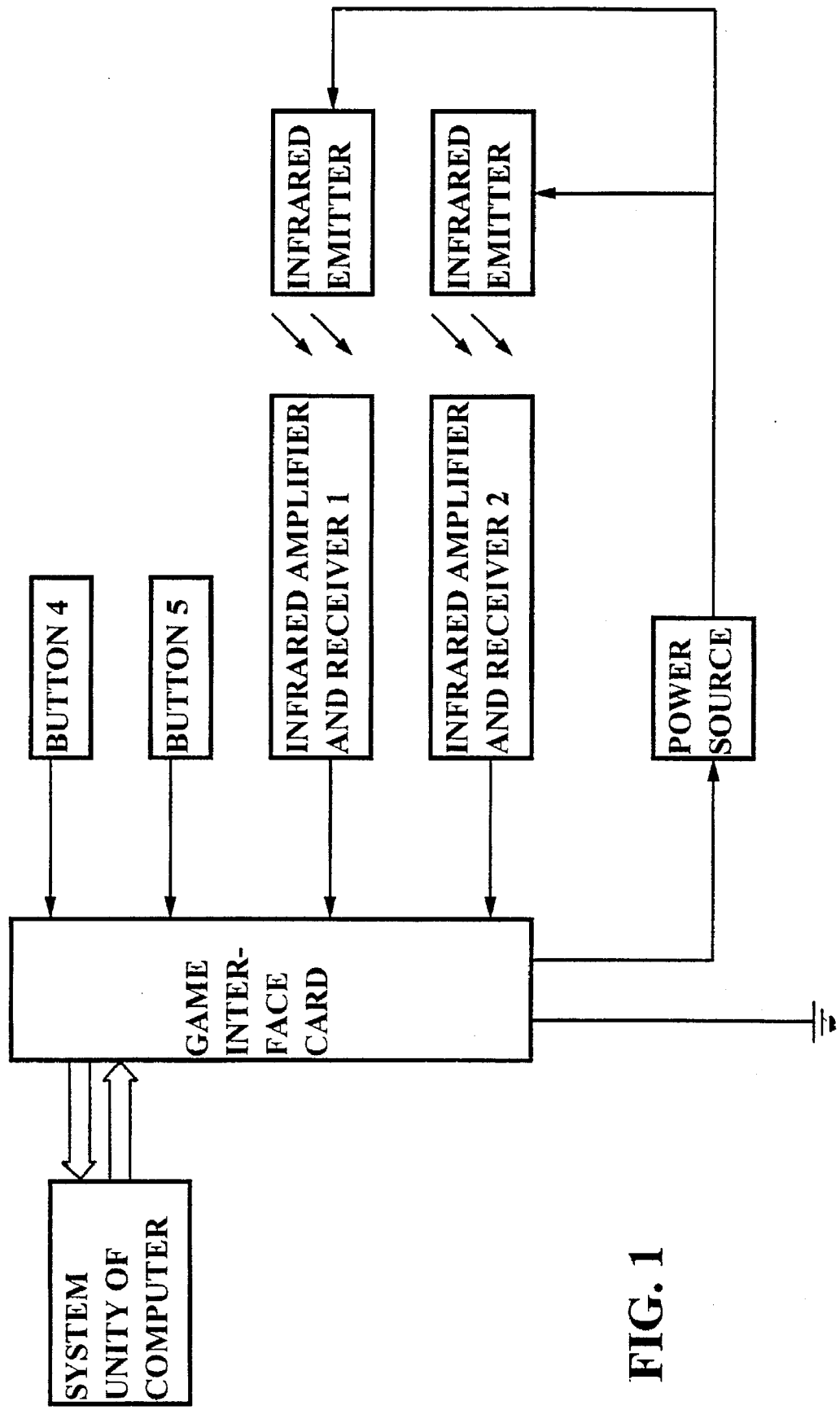
FIG. 1 is a block diagram of an embodiment of the rocker according to the present invention.
Figure 2:
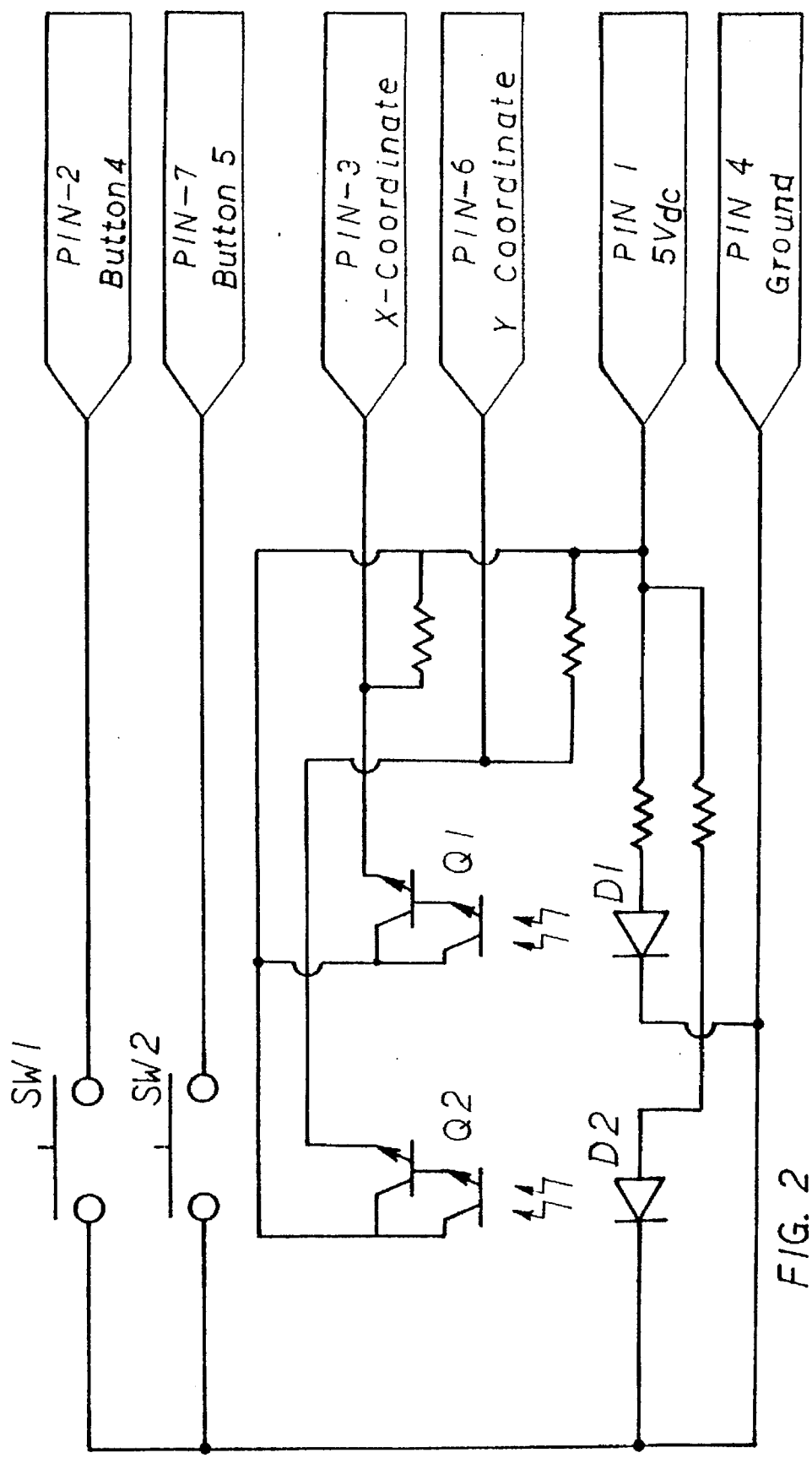
FIG. 2 is a circuit diagram of the rocker of FIG. 1.

FIGS. 1 and 2 are the block and the circuit diagrams of the present invention, respectively. Within the dotted line of FIG. 1, there is the block diagram of the rocker which corresponds with FIG. 2. Two sets of infrared receiver and infrared emitter pairs D1, Q1 and D2, Q2 are used to induce displacements on coordinate X and coordinate Y, respectively. A game interface card receives signals generated by the infrared receivers and converts the same into signals acceptable by the computer so that the converted signals are input to a system unit of the computer to control the movement of a cursor on a screen. The infrared receiver 2 itself is also a Darlington amplifier and can therefore amplify the induced signals. Push bottons SW1 and SW2 are general control buttons for effecting emission and selection, etc.

In the present invention, electronic signals are emitted by means of photoelectric transmission without using contacts. Shortcomings such as contact wearing, poor contact, and unstable output due to long-term use can be avoided to prolong the life of the rocker, thus providing considerable improvement over the rocker with the variable resistance contact.

What is claimed is:

1. An optical analog rocker, comprising:

an infrared receiver;

an infrared emitter;

an external control rod;

a stationary base plate; and a rotational disk, wherein said infrared emitter is fixed to said stationary base plate and said infrared receiver is fixed to said rotational disk, said rotational disk connected to said external control rod and rotating when said external control rod is swayed in different directions causing said infrared receiver fixed thereon to shift relative to said infrared emitter, thereby changing a distance between said infrared receiver and said infrared emitter, said changing a distance between said infrared receiver and said infrared emitter causing said infrared receiver to emit light-sensitive signals of different high or low linear voltages and currents, and said signals being received by a game interface card to be sent to a computer.

2. An optical analog rocker as claimed in claim 1, further comprising two conductive plates fixedly disposed on said stationary base plate and two conductive leaf spring members disposed between said rotational disk and said stationary base plate and connected with two connectors of said infrared receiver, and said leaf spring members each being provided at a free end with a hook portion to electrically contact said conductive plates.

* * * * *